United States Patent [19]
Khanna

[11] 3,992,963
[45] Nov. 23, 1976

[54] ELASTOMER AND LIQUID TORSIONAL VIBRATION DAMPER
[75] Inventor: Jai K. Khanna, Indianapolis, Ind.
[73] Assignee: Wallace-Murray Corporation, New York, N.Y.
[22] Filed: Jan. 21, 1975
[21] Appl. No.: 542,677

[52] U.S. Cl. .................................. 74/574; 188/1 B
[51] Int. Cl.² .............................................. F16F 15/10
[58] Field of Search ....................... 74/574; 188/1 B

[56] References Cited
UNITED STATES PATENTS
| | | | |
|---|---|---|---|
| 2,585,382 | 2/1952 | Guernsey | 74/574 |
| 3,077,123 | 2/1963 | Katzenberger | 74/574 |
| 3,653,278 | 4/1972 | Brinkman | 74/574 |

Primary Examiner—Samuel Scott
Assistant Examiner—F. D. Shoemaker

[57] ABSTRACT

A torsional vibration damper having two inertia members. A first inertia member is coupled to a hub by elastomer. A second inertia member is positioned within an annular cavity and is surrounded by a liquid of high viscosity. Under the influence of torsional vibrations relative movement arises between the hub and first inertia member, the hub and the second inertia member, and the first and second inertia members. The latter relative motion inhibits the attainment of resonance by either of the two inertia members.

14 Claims, 3 Drawing Figures

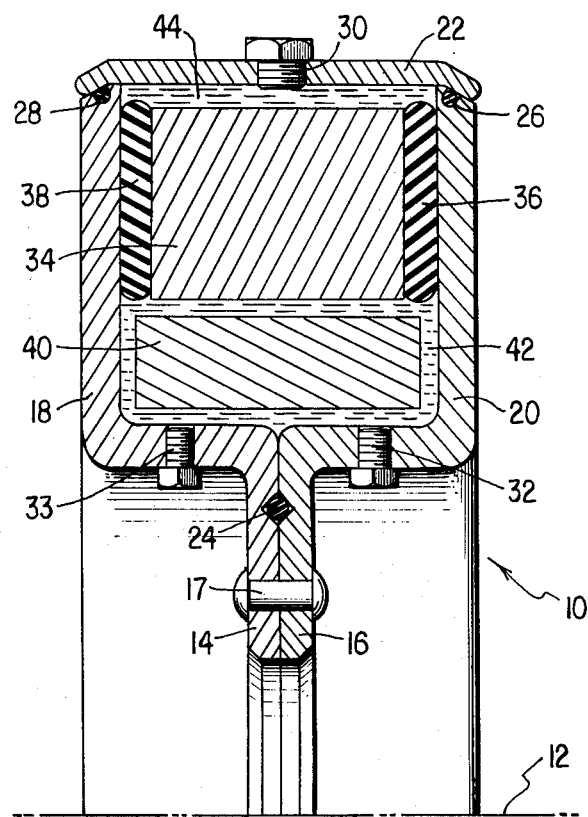
FIG. 1
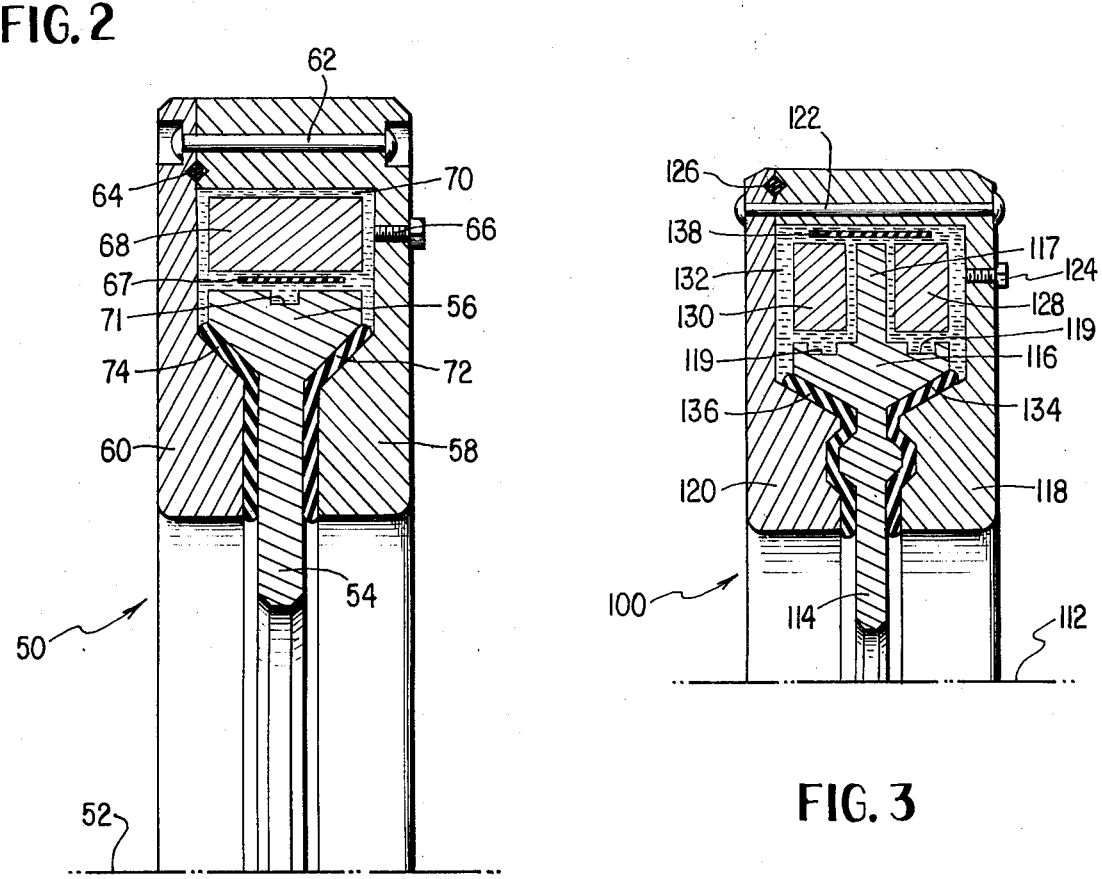
FIG. 2
FIG. 3

ELASTOMER AND LIQUID TORSIONAL VIBRATION DAMPER

This invention relates to a torsional vibration damper. Such dampers are employed to reduce torsional vibrations and find extensive use in the automotive and the diesel engine industry. Torsional vibrations arise from the force of exploding gases acting upon pistons in an internal combustion engine. These forces are delivered intermittently to the crank shaft. Depending upon the natural torsional frequency of vibration of the crank shaft, angular vibrations of considerable magnitude may result at some engine speeds and may cause gear damage and fatigue failure of the crankshaft.

The problem of torsional vibrations in crank shafts for internal combustion engines has long engaged the attention of workers in the art and a great variety of torsional vibration dampers are known. A common form of such damper is afforded by a hub attached to the crank shaft so as to rotate therewith. The periphery of the hub may carry an elastomer member which in turn is coupled to an outermost, inertia member. During the engine operation, the torsional damper serves to lessen the magnitude of the angular vibrations of the crank shaft to which it is attached. Being coupled directly to the crank shaft, this lessens the likelihood of a fatigue failure of the crank shaft due to torsional vibrations of substantial magnitude. Torsional vibrational dampers are also known which employ a liquid of high viscosity. Such an arrangement is afforded by a hub member which carries a closed, annular cavity therein, the annular cavity being filled with a liquid of high viscosity and with an annular inertia member. The only coupling between the inertia member and the hub, the latter being connected to the crank shaft, is the viscous liquid. The prior art is also aware of torsional vibration dampers which employ both viscous and elastomer dampers. While not intended to be exhaustive, the attention of the reader is invited to the following U.S. patents as illustrative of such prior constructions: U.S. Pat. No. 1,230,205, issued to Nichols, No. 2,585,382, issued to Guernsey, No. 2,636,399, issued to O'Connor, No. 2,939,338, issued to Troyer, No. 3,373,633, issued to Desmond, No. 3,410,369, issued to Ishizuka, No. 3,440,899, issued to McGavern, No. 3,495,475, issued to Rumsey, No. 3,678,783, issued to Aoki, No. 3,640,149, issued to McLean, No. 3,641,839, issued to Greeley, No. 3,771,380, issued to Bahr, and No. 3,823,619, issued to Shotwell.

One disadvantage of prior constructions wherein both a viscous damper and an elastomer damper are embodied in a single rotating element is that each damper retains its own resonant frequency. Either at that frequency or some harmonic thereof, a dangerously high vibrational amplitude could be encountered. The designer of damper devices always seeks to minimize the possibility of such an occurrence.

According to the practice of this invention, two inertia members are elastically and viscously connected, in a manner analogous to that known in the prior art, to a hub member. The hub member is in turn rotationally coupled to the crank shaft or drive shaft of the internal combustion engine. The construction is such that there is a film or interface between the viscous liquid supported and the elastomer supported inertia member, the interface being provided with a film or layer of the viscous liquid. By virtue of this construction, three distinct relative motions are realized. In the first, there is relative motion (during torsional vibrations) between the elastomer supported inertia member and the hub. Secondly, there is relative motion between the viscous liquid supported inertia member and the hub. Thirdly, there is relative motion between the elastomer supported inertia member and the viscous liquid supported inertia member, due to the viscous coupling between these two members. Such a construction inhibits the attainment of resonance by either of the two inertia member ensembles. It will be recalled that each three-element ensemble defined by the crank shaft, an inertia member, and a coupling therebetween (whether elastomeric or viscous) will have a resonant frequency. Should, for example, the resonant vibrational frequency of the elastomer supported inertia member be approached, under a certain set of operating conditions, the viscous coupling between the two inertia members will inhibit the final attainment of such a condition. While not essential, a preferred mode of carrying out the invention is to construct the two inertia members so that they exhibit, in their ensemble, significantly different resonant frequencies In the drawings:

FIG. 1 is a partial cross-sectional view illustrating a first embodiment of the invention.

FIG. 2 is a view similar tp FIG. 1 and illustrates a second embodiment of the invention.

FIG. 3 is a view similar to FIG. 1 and illustrates a third embodiment of the invention.

Referring now to FIG. 1, the numeral 10 denotes generally the visco-elastic damper according to this invention. A section is taken through the upper half of the device and it will be understood that the entire device assumes the form of an annulus rotatable about an axis denoted by the numeral 12. This axis is, typically, coincident with the axis of rotation of the crank shaft. Numerals 14 and 16 denote metal sheets bent in the indicated configuration and held together at an inner radial portion by a plurality of angularly spaced rivets 17. The outermost radial walls of the damper are denoted by the numerals 18 and 20 and a top cover 22 secured, as by pressing, to the top edges of wall portions 18 and 20. Seal elements 24, 26 and 28 are provided where indicated and perform the function of insuring that a liquid of relatively high viscosity will not escape from the continuous, annular cavity defined by cover 22 and walls 18, 20. An aperture plug 30 is provided in cover 22 for the introduction of a liquid of relatively high viscosity, similar plugs at the lower portion of walls 18, 20 are denoted by the numerals 32 and 33..

The numeral 34 denotes a first inertia member which is continuous and annular and which is held between elastomer elements 36 and 38, the latter being suitably fixed to, respectively, wall portions 20 and 18. The elastomer elements 36 and 38 are continuous. The first inertia member 34 generally places the elastomer elements 36 and 38 under compression in axial direction, i.e., a direction parallel to axis of rotation. Additionally, the elastomer may be adhesively bonded to one or both of the inertia members 34 or the sidewalls 18, 20. Numeral 40 denotes a second inertia element, also continuous and annular. The numeral 42 denotes a liquid of relatively high viscosity surrounding the second inertia member 40. Similarly, the numeral 44 denotes a second mass or volume of liquid of relatively high viscosity. It will be seen that the liquid 44 is maintained in its annular chamber by seal elements 26 and 28 and also by elastomer elements 36 and 38, together with cover 22 and the upper (radially outermost) portion of inertia member 34. Similarly, liquid 42 is maintained in its annular cavity by seal 24, the lower portions of walls 18 and 20, the lower portion of elastomer members 36 and 38, and the innermost radial portion of the first inertia member 34.

The operation of the torsional vibration damper of FIG. 1 is as follows. The damper is suitably coupled to a shaft whose axis of rotation coincides with axis 12 and subject to torsional vibrations. As noted above, such a shaft may be the end or a portion of the crank shaft of an internal combustion engine. As the shaft to which the damper is coupled rotates, all of the elements will immediately commence to rotate at substantially the same speed with the exception of the second inertia member 40. Because of its rotary inertia, a time interval will elapse for the purpose of transmitting the rotational energy by shear forces from the interior of the annular cavity defined by walls 18 and 20 to the liquid 42 and thence to the second inertia member 40, depending upon the viscosity of the fluid. In the event, now, that torsional vibrations arise in the shaft to which the damper is coupled, they will be attenuated in a known manner, by both the inertia member 34 and the inertia member 40. Because the damping action is well understood by workers in this art, only a brief explanation will be given. In general, the excitations generated by the exploding gases in the cylinders will cause relative motion between inertia member 34 and the crank shaft. The accelerating or decelerating vibrational pulses are transmitted to that inertia member through elastomers 36 and 38. The elastomer elements, ideally, convert the mechanical energy of the vibrations into heat due to internal friction. Similarly, in the case of the second inertia member 40, the mechanical energy of torsional vibration in the shaft will be converted to heat by virtue of shear forces in liquid 42, the shearing taking place between the exterior of inertia member 40 and the interior of the cavity in which it is positioned.

Unlike, however, the actions of prior art torsional vibration dampers, the damper of FIG. 1 exhibits a specific cooperation between the inertia members. As in the prior art, there is relative angular motion between inertia member 34 and walls 18, 20. Similarly, there is relative angular motion between second inertia mass 40 and walls 18, 20. Each inertia member 34, 40 along with its couplings exhibits, as previously explained, its own particular resonant angular frequency. It is the desire of workers in this art to avoid the attainment of resonance by inertia members. By virtue of the fluid coupling between the outer diameter of inertia member 40 and the inner diameter of inertia member 34, there also exists a third relative angular motion heretofore unknown in this art. The inertia members thus exert a direct influence on each other by the action of liquid shear forces. Such action inhibits the attainment of resonance by either one of the two inertia members.

Referring now to FIG. 2 of the drawings, a second embodiment of the invention is illustrated. The numeral 50 denotes generally this second tuned vibration damper and again an upper half only is shown. The damper is in the general form of an annulus adapted to rotate about an axis 52 coincident with the axis of rotation of a shaft, not illustrated, to which the damper is coupled. The shaft, as in the embodiment of FIG. 1, is coupled to any prime mover subject to torsional vibrations, such as an internal combustion engine.

The numeral 54 denotes an annular hub element having a radially outermost, axially thickened portion 56. The numerals 58 and 60 denote two non-symmetrical halves which, secured together at the radially outermost portions by angularly spaced and elongated rivets 62, define a first inertia member. Numeral 64 denotes an annular seal for the purpose of preventing leakage of a viscous liquid. The numeral 66 denotes a passageway or aperture which is closable as by a plug and is for the purpose of introducing a liquid of relatively high viscosity into the continuous, annular chamber defined by the interior of inertia member portions 58, 60. The numeral 68 denotes a second annular inertia member in the annular cavity defined by the two halves 58, 60 which is positioned so as to be surrounded by liquid 70 of relatively high viscosity. The numerals 72 and 74 denote continuous elastomer members which are preferably compressed and which couple hub element 54 to first inertia element 58, 60. Additionally, an adhesive bond may be applied to the elastomer.

The operation of this embodiment is substantially the same as in the embodiment of FIG. 1. The hub element 54 is suitably secured to a shaft subject to torsional vibrations. In the event of such torsional vibrations, they are transmitted from the hub 54 to inertia members 58, 60 through elastomer elements 72 and 74. Ideally, the energy of such torsional vibrations is converted into heat within the elastomer itself. Additionally, the torsional vibrations are further attenuated by second inertia member 68, the energy being dissipated, ideally, by the shearing of liquid 70. As in the embodiment of FIG. 1, there is a shear liquid film coupling between the first and second inertia members. This coupling is defined by the liquid 70 which is between the adjacent surfaces of these inertia members. There thus exists, in the case of torsional vibrations, three distinct relative motions. The first is between the hub 54 and first inertia member 58, 60. The second is between the hub 54 and the second inertia member 68. The third is between the first and second inertia members. Recesses 71 may be provided to assist in filling the cavity with the viscous liquid.

For the purpose of preventing metal-to-metal contact between the hub and the second inertia member 68, a thin strip 67 of plastic or other material, such as Teflon or nylon, may be positioned as indicated and functions as a bearing. Such a strip may also be positioned between the two inertia members.

Referring now to FIG. 3 of the drawings, another damper embodiment is illustrated and is denoted by the numeral 100. The damper is in the general form of an annulus and is adapted to be fixed to a shaft rotating about an axis 112. The numeral 114 denotes a hub element having a radially outwardly thickened portion 116, the hub element being annular. The hub carries an annular flange 117. Annular elements or sections 118, 120 are coupled as by a plurality of angularly spaced rivets 122 at the outermost radial portions and thereby define a first inertia member. Seal 126 extends completely around the interface between sections 118 and 120 for the purpose of retaining a viscous liquid in the cavity defined by the sections.

The numerals 128 and 130 denote second and third inertia members immersed in bath 132 of liquid of relatively high viscosity. The flange 117 separates and extends between annular inertia members 128, 130.

Numerals 134 and 136 denote continuous annular elastomer members which are assigned between hub element 114 and the pair of elements 118, 120 which define the first inertia member. The elastomer is compressed between these elements, and may additionally be bonded to them. A plug such as 124 is used to fill the cavity with the viscous liquid 132.

The mode of operation of the embodiment of FIG. 3 is substantially the same as that with respect to the other embodiments. Attached to a shaft subject to torsional vibrations, hub element 114 transmits such vibrations through the elastomer to the first inertia member 118, 120. Shear forces transmitted through liquid 132 also transmit the torsional vibrations to second and third inertia members 128 and 130, respectively. Again, there are three distinct kinds of relative motions encountered in the case of this embodiment. The first is between the hub member and the first inertia member 118, 120. The second is between the hub member and the second and third inertia members 128, 130. The third is between the second and third inertia members 128, 130 and the first inertia member 118, 120. Relative motion between the second and third inertia members 128, 130 and members 117 (integral with the hub) and the first inertia member 118, 120 inhibits resonance of any of the inertia members. In some applications, an annular bearing member 138 of plastic may be added to prevent metal-to-metal (friction) contact. Annular recesses 119, angularly spaced, may be added to assist in filling the cavity with the viscous liquid.

An additional parameter is placed at the disposal of the designer with the embodiment of FIG. 3. That parameter is a difference in mass and/or shape, and hence resonant frequency, which is possible between the second inertial element 128 and the third inertia element 130.

What is claimed is:

1. A torsional vibration damper including, an annular hub member, said hub adapted to be coupled to a rotary shaft subject to torsional vibrations, a first inertia member resiliently coupled by elastomer to said hub, a closed cavity adjacent to and positioned at the radially outermost portion of said hub, a second inertia member, said second inertia member positioned within said cavity and surrounded by a liquid of relatively high viscosity, a liquid shear coupling defined by said liquid between said first and second inertia members and between said second inertia member and said hub.

2. The damper of claim 1 wherein said first and second inertia members and said cavity are annular.

3. The damper of claim 2 wherein said cavity is defined by side and lower wall portions of said hub and by a radially outermost portion of said hub and wherein said first and said second inertia members are both positioned within said annular cavity.

4. The damper of claim 1 wherein elastomer elements are positioned between the interior of said cavity and said first inertia member, and wherein said second inertia member is also positioned within said cavity.

5. The damper of claim 4 wherein said second inertia member is positioned radially inwardly of said first inertia member.

6. The damper of claim 5 wherein there is a closed, annular radial space between the outermost portion of said annular cavity and said first inertia member and wherein a liquid of relatively high viscosity is placed therein.

7. The damper of claim 2 wherein said hub is defined by two symmetrical half-sections joined at their radially innermost portions and including a seal between said portions, and wherein an outermost annular cover is positioned over and connected to the radially outermost portions of said two symmetrical portions, said halfsections having axially extending portions, to thereby define said cavity.

8. The damper of claim 2 wherein said first inertia member is defined by two annular members clamped together, said first inertia member having said cavity, said cavity receiving said second inertia member, said cavity also receiving a radially outermost portion of said hub, and wherein said elastomer is defined by elastomer elements sandwiched between said hub and said two portions which define said first inertia member.

9. The damper of claim 8 including a plastic bearing between a portion of the surface of said second inertia member and an adjacent portion of the damper.

10. The damper of claim 8 wherein the radially outermost portion of said hub is thickened in an axial direction.

11. The damper of claim 8 including a third inertia member, said third inertia member also being surrounded by liquid of relatively high viscosity, said third inertia member also positioned within said cavity.

12. The damper of claim 11 wherein said second and third inertia members are positioned on opposite sides of an outwardly extending flange integral with said hub.

13. The damper of claim 8 wherein a portion of said hub which is contacted by said viscous liquid is provided with at least one recess, to assist in filling the cavity.

14. The damper of claim 11 wherein a portion of said hub which is contacted by said viscous liquid is provided with at least one recess, to assist in filling the cavity.

* * * * *